United States Patent [19]

Rodda

[11] Patent Number: 4,704,630
[45] Date of Patent: Nov. 3, 1987

[54] WIDE BANDWIDTH DISPLAY DRIVER APPARATUS

[75] Inventor: William E. Rodda, Trenton, N.J.

[73] Assignee: RCA Corporation, Princeton, N.J.

[21] Appl. No.: 932,045

[22] Filed: Nov. 18, 1986

[51] Int. Cl.$^4$ .............................................. H04N 5/14
[52] U.S. Cl. ..................................... 358/160; 358/188;
 358/217; 358/242; 333/81 A; 333/206; 333/222
[58] Field of Search ................ 358/93, 160, 188, 217,
 358/242; 333/206, 81 A, 222

[56] References Cited

U.S. PATENT DOCUMENTS 3,699,272 10/1972 Fritz ..................................... 358/160
4,464,636 8/1984 Dobrovolny ........................ 358/188

OTHER PUBLICATIONS

Article "A High Performance Video Amplifier for High Resolution CRT Applications", published by the RF Devices Division of TRW Corp., Lawndale, Ca.

Primary Examiner—James J. Groody
Assistant Examiner—Michael D. Parker
Attorney, Agent, or Firm—Paul J. Rasmussen; Peter M. Emanuel; Ronald H. Kurdyla

[57] ABSTRACT

To improve the bandwidth of a display driver stage in a wideband video signal processing and display system, the output of a display driver amplifier is coupled to a display device via a transmission line having an unterminated output end, a misterminated source end to develop a negative non-zero source reflection coefficient, and a phase delay within a given range.

4 Claims, 1 Drawing Figure

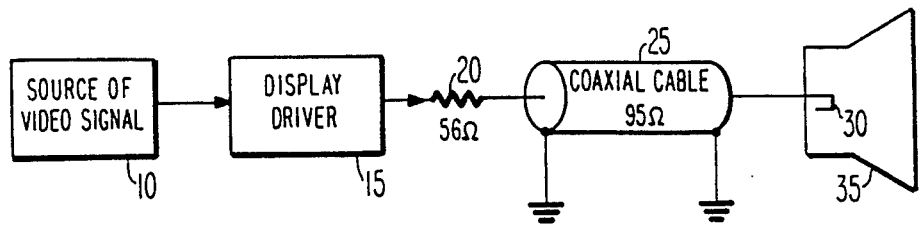

WIDE BANDWIDTH DISPLAY DRIVER APPARATUS

This invention concerns apparatus for enhancing the bandwidth of a display driver stage in a wideband video signal processing and display system.

Recent trends toward high definition video signal display systems with significantly increased picture resolution capability, including data display monitors such as computer terminals, dictate a need for a video signal processing system with a wide signal bandwidth on the order of 50 MHz to 200 MHz, for example. Wide bandwidth color data display monitors use display driver amplifiers which typically provide video output signal drive voltages on the order of 40 volts peak-to-peak to the display device. Driver amplifiers with bandwidths of 50 MHz and greater tend to be rather massive because considerable power is dissipated by driver circuit devices that require cooling by suitable heatsinks. Such massive driver amplifiers cannot be located on the connecting socket on the neck of the display device due to weight limitations on the neck of the display device. Consequently, the driver amplifiers are located in the vicinity of the display device and are connected to the display device via short interconnecting wires.

For bandwidths of approximately 50 MHz and greater, even short lengths of interconnecting wire can pose serious radio frequency interference (RFI) radiation problems which can degrade the high frequency performance of the system. The use of a shielded coaxial cable significantly reduces the RFI problem, controls stray wiring capacitance and makes the location of the driver amplifiers less critical.

It is herein recognized that a transmission line such as a shielded coaxial cable for coupling the output of the display driver amplifier to the display device also can be advantageously used to enhance the system bandwidth. In a disclosed system in accordance with the principles of the invention, a significant improvement in bandwidth is produced by employing a coaxial cable which is unterminated at its output end, which is misterminated at its source end so as to produce a negative source reflection coefficient, and which exhibits a phase delay of greater than 20° but less than 60° at the upper cut-off frequency of interest.

The sole FIGURE of the drawing shows a wideband display driver arrangement in accordance with the principles of the present invention.

A source of video signal 10 provides a video signal to a display driver amplifier 15 which provides a high level video output signal with a magnitude suitable for directly driving an image display device. In this example driver 15 is a wideband hybrid amplifier model No. CR 2424 commercially available from the RF Devices Division of TRW Corporation, Lawndale, Cal. Driver 15 exhibits a low output impedance of a few ohms, and develops a video output signal with a peak-to-peak amplitude of approximately 40 volts.

The video output signal from driver 15 is coupled via a terminating resistor 20 to a source end of a shielded transmission line 25 of the coaxial cable type, e.g., a type RG 180 coaxial cable with a characteristic impedance of 95 ohms. In this case the source end of cable 25 is misterminated in an impedance of approximately 60 ohms, including the value of resistor 20 and the value of the small output resistance of driver 15. The output end of cable 25 is unterminated and is coupled to a signal input cathode electrode 30 of an image reproducing kinescope 35, which presents a capacitance of approximately 8 picofarads to the output end of cable 25.

The source reflection coefficient K of a transmission line such as cable 25 is defined by the expression $$K = \frac{ZS - Z0}{ZS + Z0}$$

where
ZS is the output impedance of the signal source, and
Z0 is the characteristic impedance of the transmission line.

Thus cable 25 has a negative, non-zero source reflection coefficient of $-0.226$ in this example.

The phase delay angle $\theta$ caused by signal retardation resulting from the finite velocity of propogation of a signal voltage along a transmission line is defined by the expression $$\theta = 360 \frac{fl}{v}$$

where
$\theta$ is the phase delay (degrees),
f is the signal frequency (Hertz),
l is the length of the transmission line meters, and
v is the velocity of propagation of the transmission line (meters/second).

It has been found that a significant increase in bandwidth can be achieved when the upper cut-off frequency of the video signal and the length of the transmission line are such that a phase delay of approximately between 20° and 60° results, and when the source reflection coefficient is a nonzero negative number. These conditions are satisfied by the disclosed display driver arrangement.

With the disclosed arrangement, a video signal applied to the input of driver 15 was observed to produce a $-3$ db high frequency cutoff frequency of 142 MHz at the input of the display device, compared to a $-3$ db high frequency cutoff frequency of 87 MHz when a non-transmission line interconnection was used between the display driver and the display device. Thus a 60% increase in bandwidth was produced by the disclosed arrangement. The phase delay of cable 25 was observed to be 38° at 87 MHz, rising to approximately 60° at 142 MHz, with cable 25 being approximately 10 inches in length.

The disclosed arrangement produces a video signal with an overshoot of about 10%, which can be adjusted by tailoring the value of the source reflection coefficient or by modifying the operation of preceding high frequency peaking circuits such as may be included in source 10.

What is claimed is:

1. A video signal processing and display system comprising:
    an image display device for reproducing an image in response to a video signal applied to an input thereof;
    a display driver amplifier for providing an output video signal with a magnitude suitable for directly driving said input of said image display device; and
    means for coupling said output video signal from said display driver amplifier to said input of said image display device, said coupling means including a transmission line having a source end coupled to said output of said display driver amplifier and an output end coupled to said input of said image display device; wherein to improve the bandwidth of said system said transmission line is misterminated at said source end to produce a nonzero, negative source reflection coefficient; and said transmission line exhibits a minimum phase delay of approximately twenty degrees and a maximum phase delay of approximately sixty degrees, with respect to a cutoff high frequency of a video signal to be conveyed to said display driver amplifier.

2. A system according to claim 1, wherein said transmission line is a shielded coaxial cable.

3. A system according to claim 1, wherein said coupling means includes a terminating resistance for coupling said output video signal from said display driver amplifier to said source end of said transmission line; and said transmission line has a characteristic impedance greater than the value of said terminating resistance.

4. Apparatus according to claim 1, wherein said image display device is a kinescope with a cathode signal input electrode.

* * * * *